(12) United States Patent
Chou

(10) Patent No.: US 12,496,957 B2
(45) Date of Patent: Dec. 16, 2025

(54) STRAP ROLLER

(71) Applicant: STRONG YUN INDUSTRIAL CO., LTD., Taoyuan (TW)

(72) Inventor: Yeh-Chien Chou, Taoyuan (TW)

(73) Assignee: STRONG YUN INDUSTRIAL CO., LTD., Taoyuan (TW)

( * ) Notice: Subject to any disclaimer, the term of this patent is extended or adjusted under 35 U.S.C. 154(b) by 145 days.

(21) Appl. No.: 18/395,306

(22) Filed: Dec. 22, 2023

(65) Prior Publication Data

US 2025/0083918 A1   Mar. 13, 2025

(51) Int. Cl.
  *B60P 7/08* (2006.01)
  *B65H 18/10* (2006.01)
  (Continued)

(52) U.S. Cl.
  CPC ............. *B60P 7/083* (2013.01); *B60P 7/0846* (2013.01); *B65H 18/10* (2013.01); *B65H 75/406* (2013.01); *B65H 75/4476* (2013.01); *B65H 75/4481* (2013.01); *B65H 75/4494* (2013.01); *B65H 75/4428* (2013.01); *B65H 75/4431* (2013.01); *B65H 2403/46* (2013.01); *B65H 2601/30* (2013.01); *B65H 2701/375* (2013.01)

(58) Field of Classification Search
  CPC ....... B60P 7/0823; B60P 7/083; B60P 7/0846; B60P 7/0853; B65H 18/10; B65H 54/585; B65H 75/10; B65H 75/30; B65H 75/38; B65H 75/40; B65H 75/406; B65H 75/42; B65H 75/425; B65H 75/4428; B65H 75/4431; B65H 75/4476; B65H 75/4481; B65H 75/4492; B65H 75/4494; B65H 2403/40; B65H 2403/46; B65H 2601/30; B65H 2701/375; B65H 16/103
  USPC ............... 254/219, 220, 229, 296, 342, 343; 24/68 CD, 68 R, 69 ST, 69 TM, 70 ST; 242/362
  See application file for complete search history.

(56) References Cited

U.S. PATENT DOCUMENTS 5,005,777 A * 4/1991 Fernandez .............. B60R 22/44
    242/390.8
5,295,664 A * 3/1994 Kamper .................. B60P 7/083
    254/342

(Continued)

FOREIGN PATENT DOCUMENTS

CN    117864492 A  *  4/2024 ............. F16H 55/22

*Primary Examiner* — Anna M Momper
*Assistant Examiner* — Raveen J Dias
(74) *Attorney, Agent, or Firm* — LANWAY IPR SERVICES; Chun-Ming Shih

(57) ABSTRACT

A strap roller contains: a frame, a fixing post, a central shaft, a worm gear, a rotation element, a support rack, a worm, a manual crank, a cap, and a resilient locking spring. The frame includes a first fence and a second fence. The fixing post is defined between the first fence and the second fence. The central shaft is rotatably connected between the first fence and the second fence. The worm gear is fitted on the central shaft. The rotation element is fixed on the central shaft. The support rack is mounted on the frame and is located outside the first fence. The worm includes a first extension portion, a second extension portion, and a tooth portion. The manual crank is connected on the first extension portion. The cap is disposed on the first fence of the frame. The resilient locking spring is mounted on the cap.

9 Claims, 7 Drawing Sheets

(51) Int. Cl.
 *B65H 75/40* (2006.01)
 *B65H 75/44* (2006.01)

(56) References Cited

U.S. PATENT DOCUMENTS

| | | | | |
|---|---|---|---|---|
| 7,216,849 | B2* | 5/2007 | Tremblay | B66D 1/16 24/69 ST |
| 8,434,979 | B1* | 5/2013 | Genge | B61D 45/001 410/103 |
| 9,061,622 | B2* | 6/2015 | Knox | B60P 7/083 |
| 10,935,104 | B2* | 3/2021 | D'Antonio | F16G 11/12 |
| 11,097,928 | B2* | 8/2021 | King | B66D 1/14 |
| 11,603,029 | B2* | 3/2023 | Zhu | F16D 15/00 |
| 11,661,320 | B2* | 5/2023 | Forney | B66D 1/06 254/343 |
| 11,820,277 | B2* | 11/2023 | Chou | B60P 7/083 |
| 2004/0155230 | A1* | 8/2004 | Fortin | B60P 7/083 254/222 |
| 2005/0267518 | A1* | 12/2005 | Wright | A61B 17/1322 606/203 |
| 2006/0180800 | A1* | 8/2006 | Tremblay | B66D 1/16 254/219 |
| 2009/0271976 | A1* | 11/2009 | Huang | B60C 25/0509 29/802 |
| 2010/0166520 | A1* | 7/2010 | Ruan | B60P 7/083 410/156 |
| 2010/0284757 | A1* | 11/2010 | Numata | B60P 7/0823 410/103 |
| 2012/0227223 | A1* | 9/2012 | Knox | B60P 7/083 24/68 CD |
| 2014/0061556 | A1* | 3/2014 | Knox | B60P 7/083 254/220 |
| 2015/0040359 | A1* | 2/2015 | Brown | B60P 7/083 24/68 CD |
| 2016/0318436 | A1* | 11/2016 | Niu | F16H 57/12 |
| 2017/0058998 | A1* | 3/2017 | Bujold | B66D 1/14 |
| 2018/0290582 | A1* | 10/2018 | Chou | B60P 7/0853 |
| 2021/0237639 | A1* | 8/2021 | Zhu | B60P 7/0846 |
| 2022/0161708 | A1* | 5/2022 | Chou | B60P 7/083 |
| 2024/0159296 | A1* | 5/2024 | Bujold | B60P 7/0846 |
| 2024/0262279 | A1* | 8/2024 | Bujold | B60P 7/0853 |

* cited by examiner

STRAP ROLLER

TECHNICAL FIELD

The present invention relates to a strap roller which is operated easily and quickly.

BACKGROUND

A conventional flexible strap is operated manually or electrically to tie objects or goods onto a vehicle to avoid a dropping or removal of the objects or goods.

A strap roller is disclosed in CN Patent No. 104781107 A and contains a strap operator and a flexible strap. The flexible driver includes a central shaft, a driving post, a worm and an anchoring strut. The strap operator includes a frame and a receiving space defined between two fences of the frame, and the frame has a central position column, a drive column, a worm, and a fixing column. The central shaft is configured to removably connect with a first segment of the flexible strap, and the central shaft has a worm gear. The drive column is manually operated by rotating a crank or is electrically operated to drive the worm to rotate. The worm has a spiral trench configured to engage with teeth of the worm gear, thus actuating the worm gear and the central shaft to revolve. The fixing column is configured to fix a second segment of the flexible strap. Thereby, the manual crank is manually or electrically operated to wind the first segment of the flexible strap, and a length of the flexible strap is shorten to cause tying tension, thus tying objects or goods.

However, such a conventional strap roller has defects as follows:

1) A tooth number of the worm gear is 16T, 24T or 28T. Taking 28T for example, when the worm is rotated one circle, the worm is rotated for one tooth merely. So, when desiring to rotate the worm gear for one circle, it is required to rotate the worm for 24 circles. After tying the objects, the worm gear is rotated for at least one 1.5 circles to produce tying force. Thus, the manual crank will be turned for 36 circles to drive the worm to rotate for 1.5 circles. Also, when desiring to release the flexible strap to remove the objects, the manual crank will be rotated for at least 36 circles reversely, thus operating the strap roller troublesomely.
2) When operating the strap roller electrically, a production cost of the electrical strap roller will increased.
3) When the user operates the strap roller wrongly, the worm will be forced upward to act on the frame, but the locking spring cannot bear an action force of the worm to remove from a receiving groove of the worm, thus causing a removal or a damage of the worm.

The present invention has arisen to mitigate and/or obviate the afore-described disadvantages.

SUMMARY

The primary aspect of the present invention is to provide a strap roller which is operated easily and quickly.

To obtain above-mentioned aspect, a strap roller provided by the present invention contains: a frame, a fixing post, a central shaft, a worm gear, a rotation element, a support rack, a worm, a manual crank, a cap, and a resilient locking spring.

The frame includes a first fence and a second fence connected with the first fence so as to define a receiving space, and the first fence has a first edge, the second fence has a second edge.

The fixing post is defined between the first fence and the second fence, and an end of the fixing post adjacent to the first edge is fixed with a coupling segment of a flexible strap.

The central shaft is rotatably connected between the first fence and the second fence of the frame and is close to the second edge so that a movable segment of the flexible strap is inserted and winded.

The worm gear is fitted on an end of the central shaft and located outside the first fence.

The rotation element is fixed on the other end of the central shaft and is located outside the second fence so as to be manually operated to quickly drive the central shaft to rotate.

The support rack is mounted on the frame and is located outside the first fence, wherein the support rack includes a first coupling wall and a second coupling wall.

The worm includes a first extension portion, a second extension portion, and a tooth portion between the first extension portion and the second extension portion. The first extension portion is fitted on the first coupling wall of the support rack; and the second extension portion is fitted on the second coupling wall of the support rack. The worm is limited to move between an engagement position and a disengagement position. When the worm is limited at the engagement position, the tooth portion of the warm is engaged with the worm gear. When the worm is limited at the disengagement position, the tooth portion of the worm is disengaged from the worm gear. The first extension portion has a defining groove defined on an outer wall thereof.

The manual crank is connected on the first extension portion of the worm to drive the worm so that the worm actuates the worm hear and the central shaft to change a length and a tension of the flexible strap.

The cap is disposed on an outer wall of the first fence of the frame to cover the worm gear, the support rack, and the tooth portion of the worm.

The resilient locking spring is mounted on the cap so that when the worm is moved to the disengagement position, and the resilient locking spring is limited in the defining groove of the worm.

DETAILED DESCRIPTION

Figure 1:
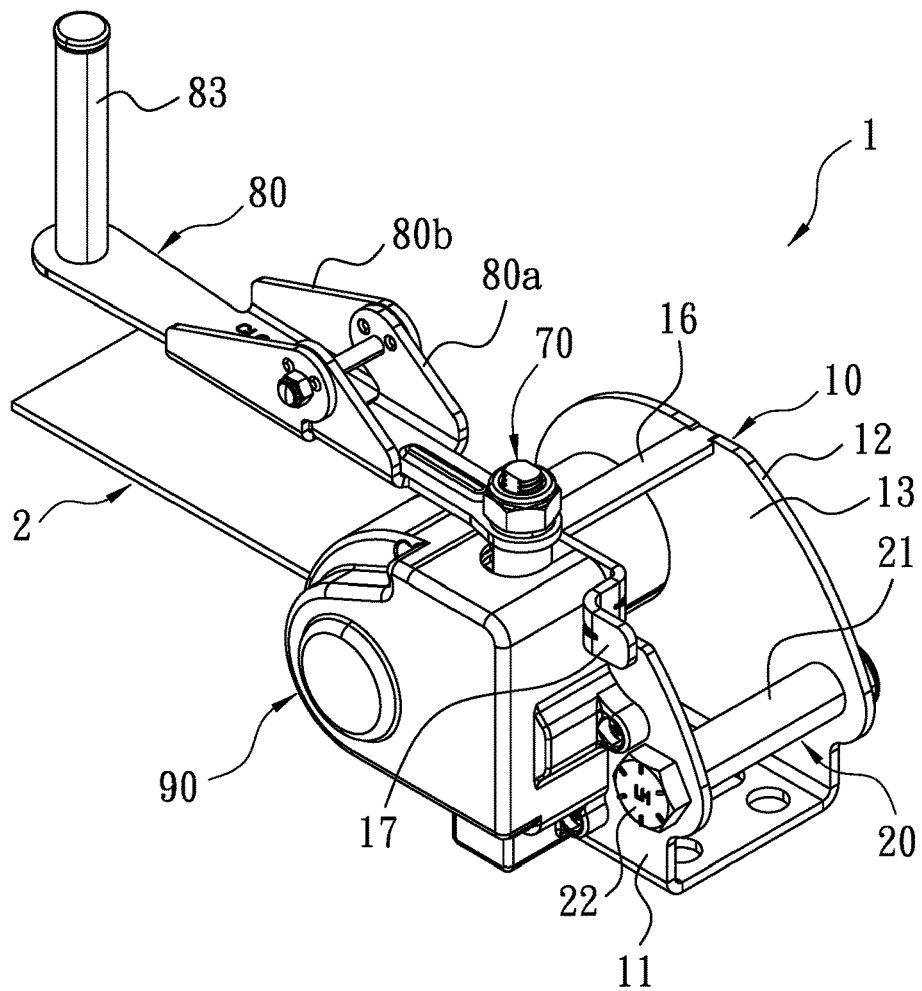
FIG. 1 is a perspective view showing the assembly and the operation of a strap roller according to a preferred embodiment of the present invention.
Figure 2:
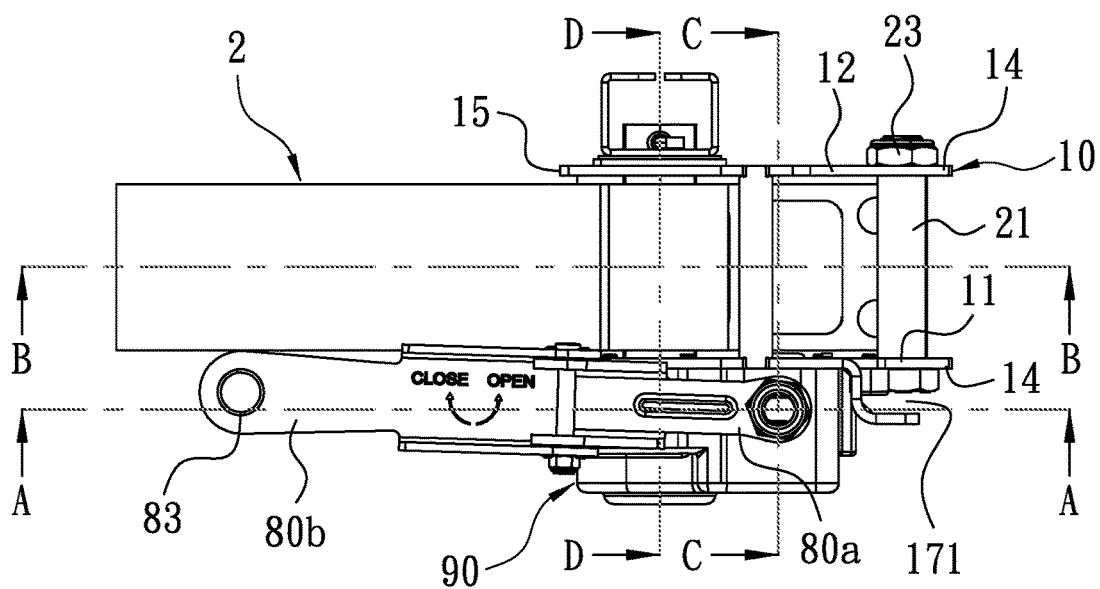
FIG. 2 is a top plan view of FIG. 1.

With reference to FIGS. 1-7, a strap roller 1 according to a preferred embodiment of the present invention comprises: a frame 10, a fixing post 20, a central shaft 30, a worm gear 40, a rotation element 50, a support rack 60, a worm 70, a manual crank 80, a cap 90, and a resilient locking spring 100.

The frame 10 includes a first fence 11 and a second fence 12 connected with the first fence 12 so as to define a receiving space 13, wherein each of the first fence 11 and the second fence 12 has a first edge 14, and each of the first fence 11 and the second fence 12 has a second edge 15. In this embodiment, a bottom of the first fence 11 is integrally connected with the second fence 12, and a top of the first fence 11 is engaged with a top of the second fence 12 by using a connection sheet 16.

Figure 4:
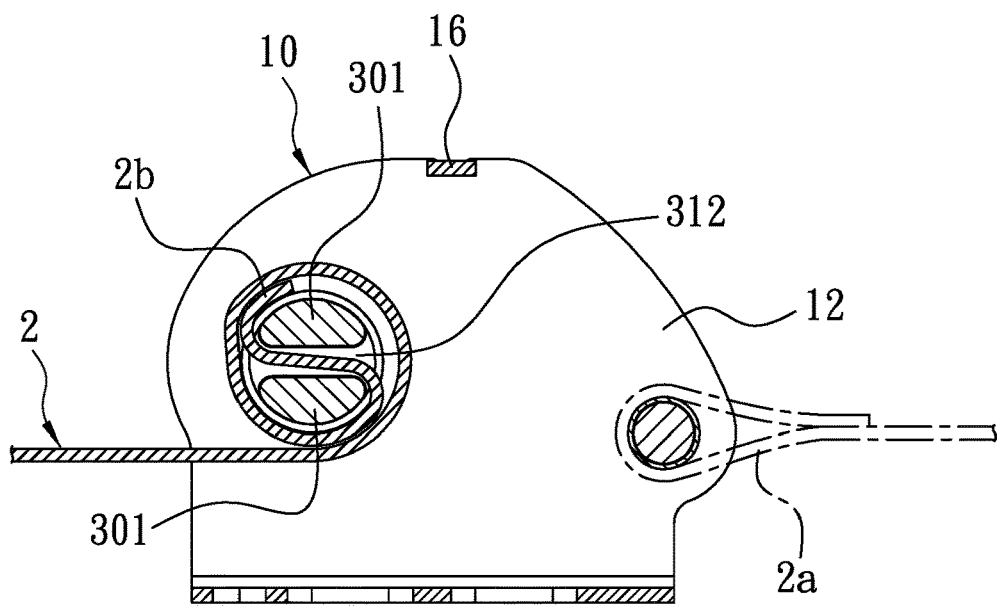
FIG. 4 is a cross sectional view taken along the line B-B of FIG. 2 and shows an imaginary line of a movable segment of a flexible strap.

The fixing post 20 is defined between the first fence 11 and the second fence 12, and an end of the fixing post 20 adjacent to the first edge 14 is fixed with a coupling segment 2a of a flexible strap 2, as shown in FIG. 4. The fixing post 20 includes a movable sleeve 21, a threaded bolt 22, and a nut 23, such that the threaded bolt 22 is inserted through the first fence 11 of the frame 10, the movable sleeve 21, and the second fence 12 to screw with the nut 23, hence the movable sleeve 21 is rotatably connected in the receiving space 13 of the frame 10.

The central shaft 30 is rotatably connected between the first fence 11 and the second fence 12 of the frame 10 and is close to the second edge 15 so that a movable segment 2b of the flexible strap 2 is inserted and winded, as shown in FIG. 4.

The worm gear 40 is fitted on an end of the central shaft and is located outside the first fence 11.

The rotation element 50 is fixed on the other end of the central shaft 30 and is located outside the second fence 12 so as to be manually operated to quickly drive the central shaft 30 to rotate.

The support rack 60 is mounted on the frame 10 and is located outside the first fence 11, wherein the support rack 60 includes a first coupling wall 61 and a second coupling wall 62.

Figure 3:
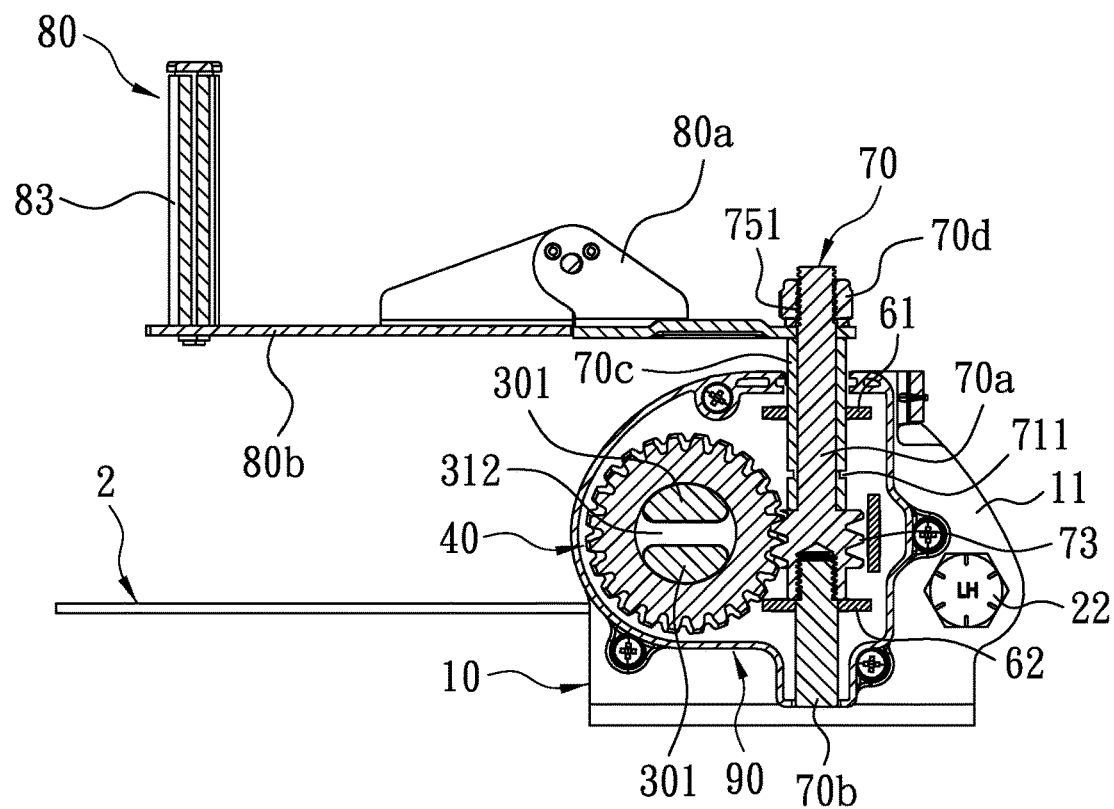
FIG. 3 is a cross sectional view taken along the line A-A of FIG. 2.
Figure 5:
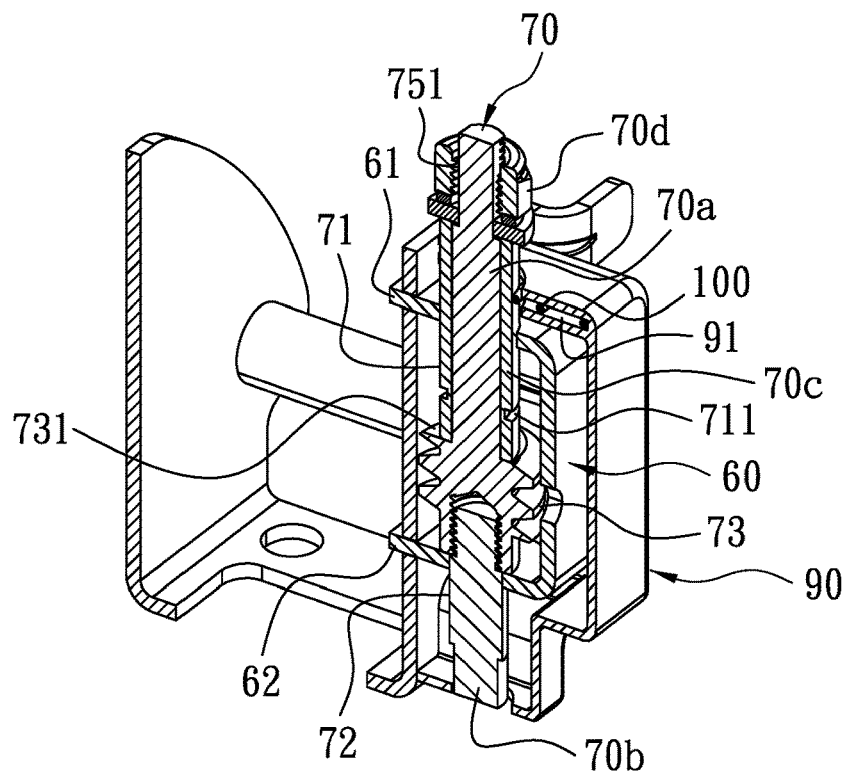
FIG. 5 is a cross sectional view taken along the line C-C of FIG. 2.
Figure 9:
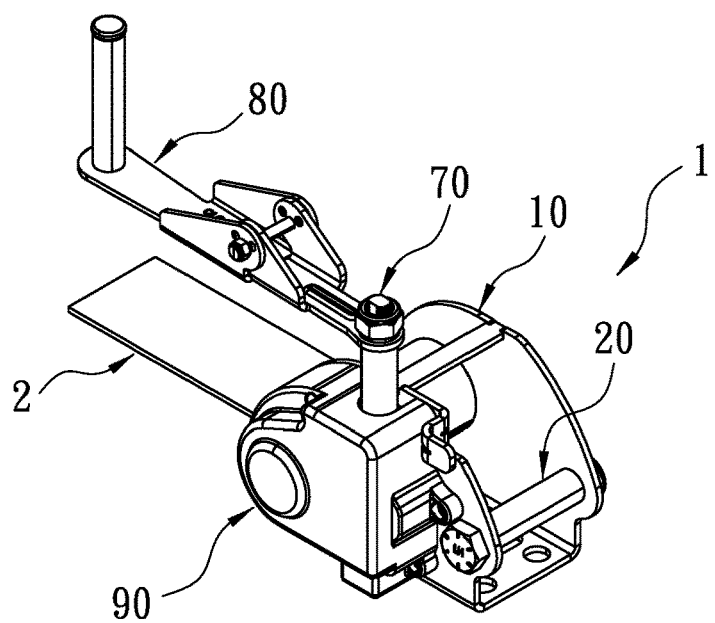
FIG. 9 is a perspective view showing the operation of the strap roller according to the preferred embodiment of the present invention.
Figure 10:
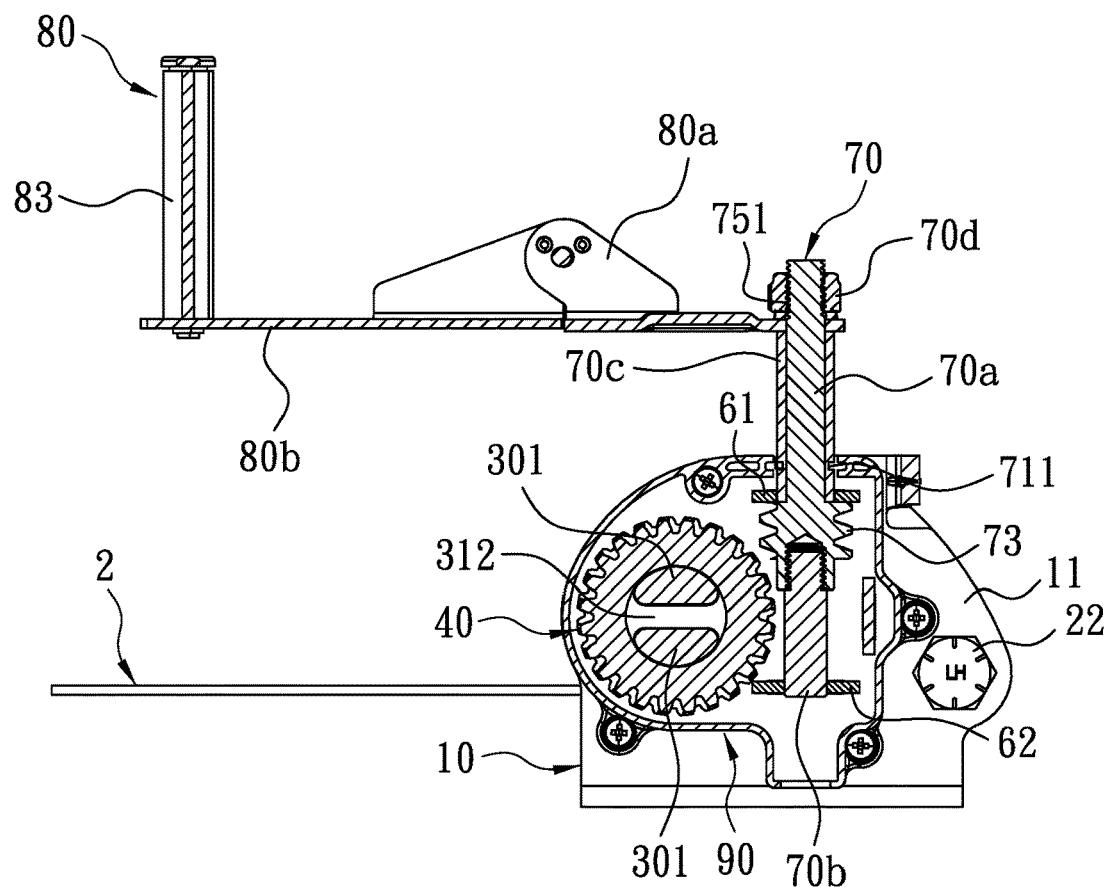
FIG. 10 is a cross sectional view showing the assembly of FIG. 9.

Referring to FIG. 5, the worm 70 includes a first extension portion 71, a second extension portion 72, and a tooth portion 73 between the first extension portion 71 and the second extension portion 72. The first extension portion 71 is fitted on the first coupling wall 61 of the support rack 60, and the second extension portion 72 is fitted on the second coupling wall 62 of the support rack 60. The worm 70 is limited to move between an engagement position and a disengagement position. As shown in FIGS. 1 and 3, when the worm 70 is limited at the engagement position, the tooth portion 73 of the warm 70 is engaged with the worm gear 40. As illustrated in FIGS. 9 and 10, when the worm 70 is limited at the disengagement position, the tooth portion 73 of the worm 70 is disengaged from the worm gear 40. Also, the first extension portion 71 has a defining groove 711 defined on an outer wall thereof.

The manual crank 80 is connected on the first extension portion 71 of the worm 70 to drive the worm 70 so that the worm 70 actuates the worm gear 40 and the central shaft 30, and a length and a tension of the flexible strap 2 are changed.

In other words, when the length of the flexible strap 2 is shorten, the tension of the flexible strap 2 become larger to bind an object, such as goods on a truck.

The cap 90 is disposed on an outer wall of the first fence 11 of the frame 10 to cover the worm gear 40, the support rack 60, and the tooth portion 73 of the worm 70.

Figure 8:
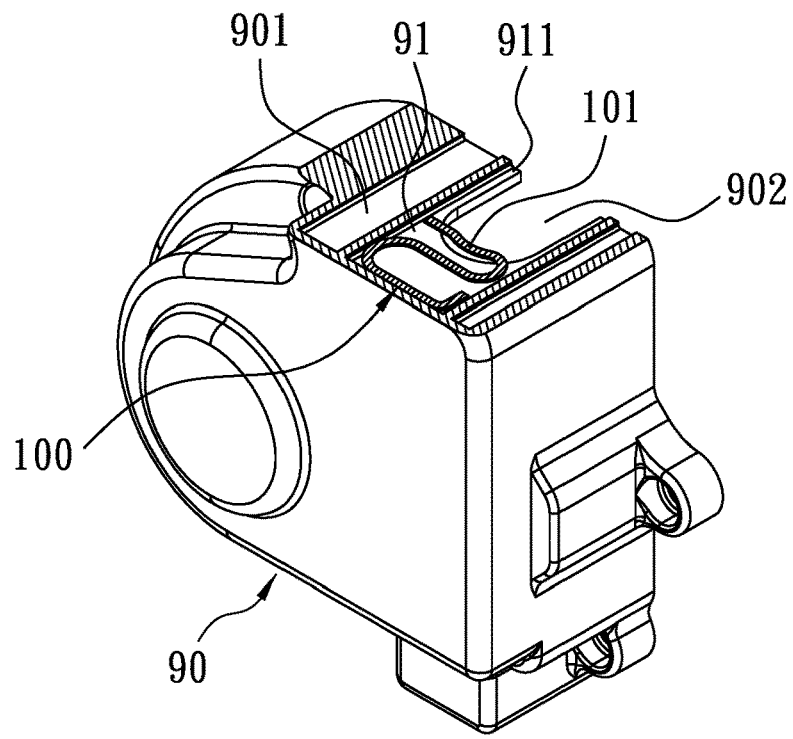
FIG. 8 is a perspective view showing the assembly of a part of the strap roller according to the preferred embodiment of the present invention.
Figure 11:
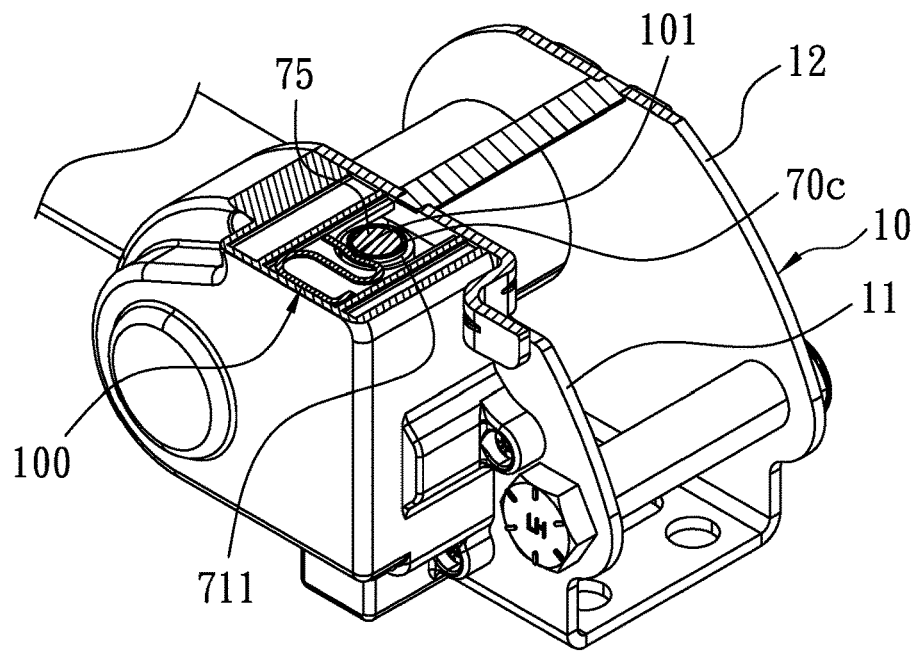
FIG. 11 is another cross sectional view showing the assembly of FIG. 9.

The resilient locking spring 100 is mounted on the cap 90 so that when the worm 70 is moved to the disengagement position, the resilient locking spring 100 is limited in the defining groove 711 of the worm 70, as shown in FIGS. 8 and 11, and the worm 70 is fixed on the disengagement position, thus avoiding the worm 70 vertically dropping to the engagement position.

Figure 7:
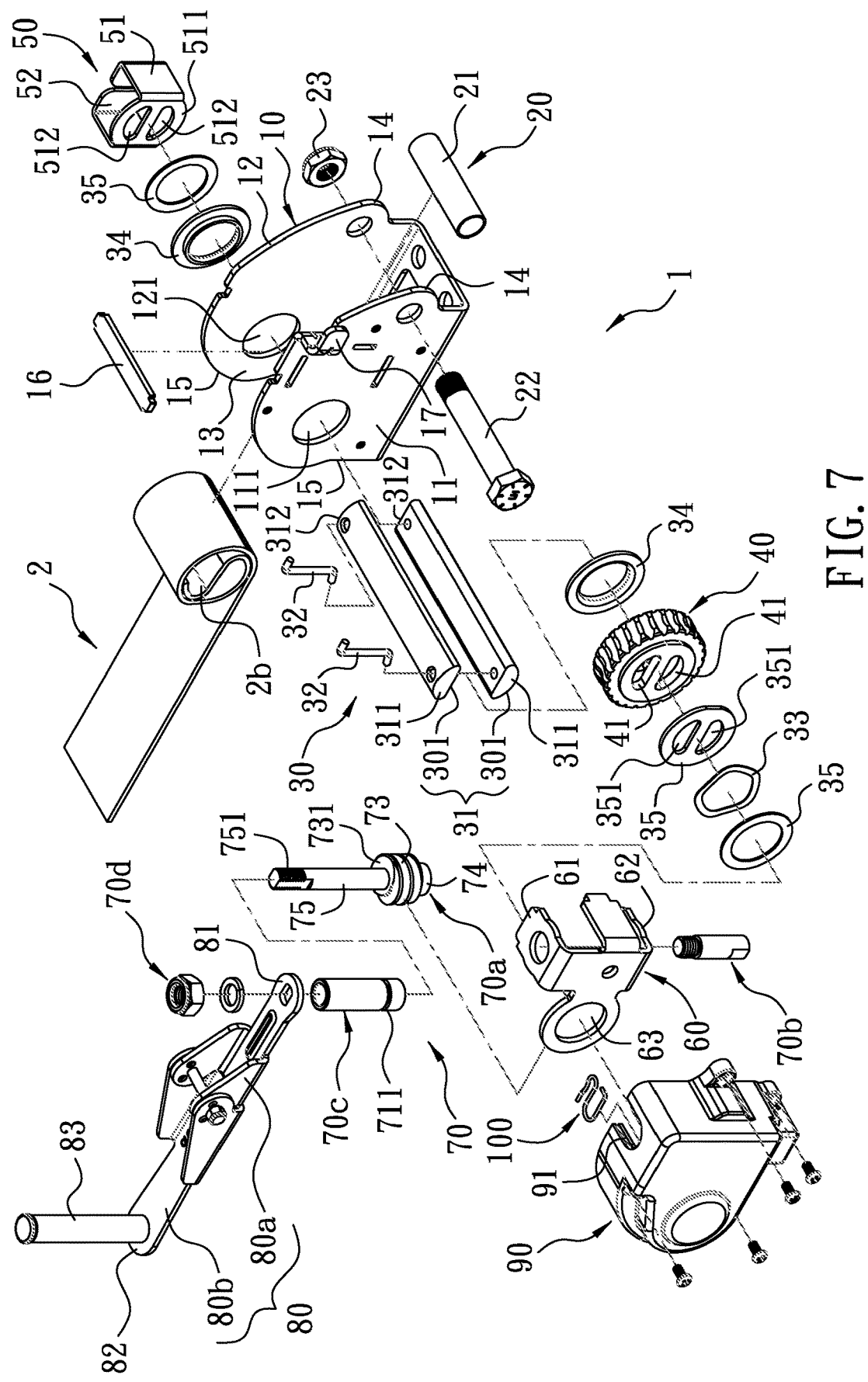
FIG. 7 is a perspective view showing the exploded components of the strap roller according to the preferred embodiment of the present invention.

In this embodiment, as illustrated in FIG. 7, the first fence 11 has a first coupling orifice 111 adjacent to the second edge 15, and the second fence 12 has a second coupling orifice 121 proximate to the second edge 15. The rotation element 50 includes a case 51 and a cavity 52 formed inside the case 51, wherein the case 51 has a cliff 511 with respect to the second fence 12 and two spaced orifices 512 defined on the cliff 511. The worm gear 40 includes two separated orifices 41. The support rack 60 is engaged on the first fence 11 of the frame 10 and includes a positioning orifice 63. The central shaft 30 includes a body 31 with two half-moon pieces 301, wherein a respective one half-moon piece 301 has a first segment 311 and a second segment 312, and the first segment 311 is inserted through the first coupling orifice 111 of the first fence 11, the two separated orifices 41 of the worm gear 40, and the positioning orifice 63 of the support rack 60 to engaged with the first segment 311 by a retainer 32 so as to limit a removal of the support rack 60 from the first fence 11. The second segment 312 is inserted through the second coupling orifice 121 of the second fence 12, the two spaced orifices 512 of the rotation element 50 to engage with the second segment 312 by the other retainer 32 so as to limit a removal of the rotation element 50 from the second fence 12. A through groove 313 is defined between the two half-moon pieces 301 to receive the movable segment 2b of the flexible strap 2, as illustrated in FIG. 4.

Figure 6:
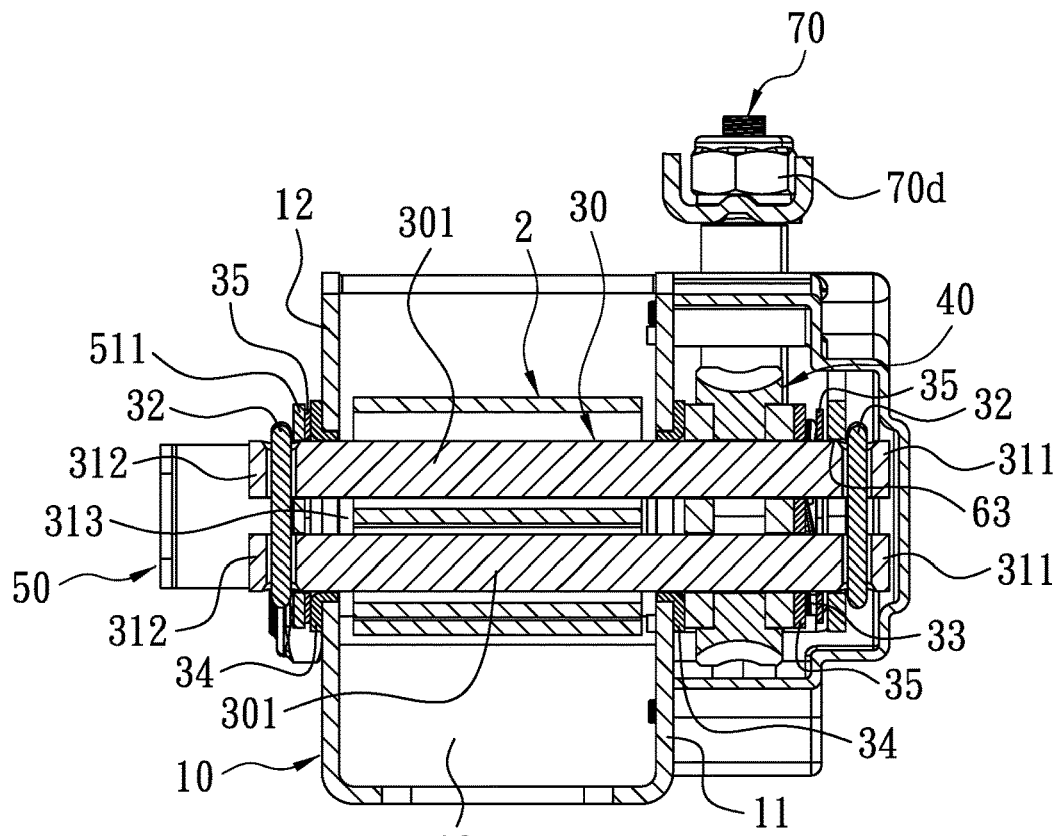
FIG. 6 is a cross sectional view taken along the line D-D of FIG. 2.

As shown in FIG. 6, the body 31 has a wave-shaped spring 33 fitted between the worm gear 40 and the support rack 60 to provide elasticity to the worm gear 40, such that the worm gear 40 moves adjustably and automatically with respect to the tooth portion 73 of the worm 70 to facilitate a movement of the worm 70 from the disengagement position to the engagement, and the tooth portion 73 is engaged with the worm gear 40 quickly and stably.

The central shaft 30 further includes two sheathes 34 engaged with the first coupling orifice 111 of the first fence 11 and the second coupling orifice 121 of the second fence 12 to receive the body 31. At least one washer 35 is defined between the two sheathes 34, the cliff 511 of the rotation element 50, the wave-shaped spring 33, the worm gear 40, and the support rack 60 so that the central shaft 30 and the worm gear 40 rotate smoothly. In addition, one washer 35 between the wave-shaped spring 33 and the worm gear 40 have two fixing orifices 351 configured to fix on the two half-moon pieces 301 so that the one washer 35 rotates with the worm gear 40, and the one washer 35 moves relative to the wave-shaped spring 33, thus rotating the worm gear 40 smoothly to avoid a friction and damage of the worm gear 40.

Referring to FIG. 7, the worm 70 includes a base 70a, a locking element 70b, a receiving sleeve 70c, and a screwing element 70d.

The base 70a has a connector 74, a stem 75, and the tooth portion 73 between the connector 74 and the stem 75, and the connector 74 is limited on a top of the second coupling wall 62 of the support rack 60, wherein the stem 75 has a head 751 formed on a top thereof and having a rectangular cross section to engage with the manual crank 80, the locking element 70b is columnar and is screwed with the connector 74 of the base 70a via the second coupling wall 62 of the support rack 60 and to form the second extension portion 72. The receiving sleeve 70c is slidably fitted on the stem 75 of the base 70a to form the first extension portion 71 and to expose the head 751 outside, wherein the receiving sleeve 70c further has a limiting trench 711. The screwing element 70d is screwed on the head 751 of the stem 75 to force the manual crank 80 on the receiving sleeve 70c.

The manual crank 80 includes a first extension 80a and a second extension 80b rotatably connected with the first extension 80a. A free segment 81 of the first extension 80a is located on the worm 70. The second extension 80b has a tubular grip 83 rotatably connected on a free segment 82 thereof and configured to be held by a user, such that the user manually rotate the tubular grip 83 to actuate the worm 70 to revolve. For example, worm 70 is actuated to revolve in a clockwise direction so that the worm 70 drives the worm gear 40 and the central shaft 30 to rotate at the engagement position, and the flexible strap 2 is bound and rotated in a counterclockwise direction, thus releasing the flexible strap 2.

Figure 12:
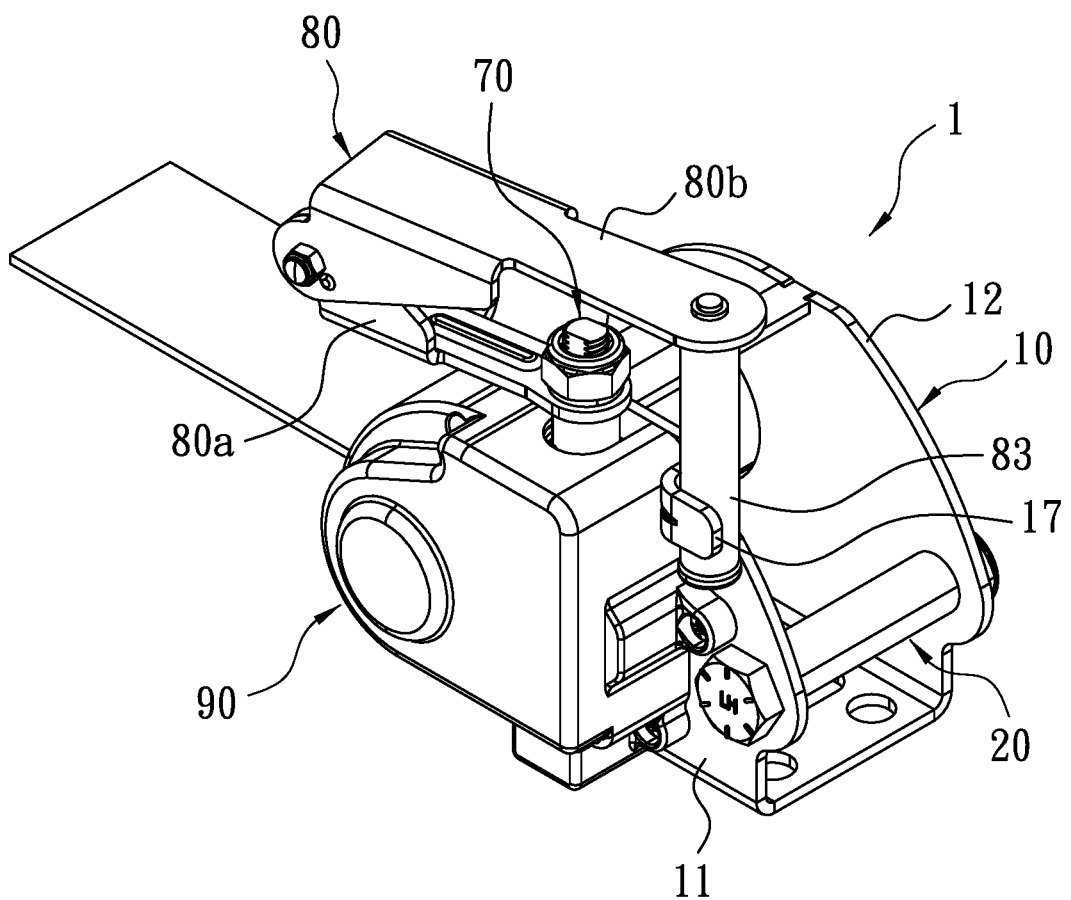
FIG. 12 is a perspective view showing the assembly of the strap roller and the manual crank being in a retracting state.

With reference to FIG. 12, the frame 10 further includes a stop sheet 17 formed on the first fence 11 thereof, and a locating trench 171 is defined between the stop sheet 17 and an outer wall of the first fence 11, such that after the second extension 80b is rotated 180 degrees with respect to the first extension 80a, the tubular grip 83 is engaged in the locating trench 171, hence the manual crank 80 does not move loosely to remove the flexible strap 2.

Referring to FIG. 8, the cap 90 includes a notch 91 with an opening 911 facing the first fence 11 of the frame 10. The resilient locking spring 100 is formed in an Z shape and is fixed in the notch 91 by being put from the opening 911, wherein the resilient locking spring 100 has an arcuate retaining portion 101 engaged in the limiting trench 711, as illustrated in FIG. 11.

As shown in FIGS. 8, the cap 90 includes a top fringe 901 in which the notch 91 is defined, and the top fringe 901 has a passing orifice 902 configured to receive the first extension portion 71 of the worm 70, wherein the arcuate retaining portion 101 of the resilient locking spring 100 is received in the passing orifice 902.

It is to be noted that the resilient locking spring 100 is configured to fix the worm 70 at the disengagement position, hence the tooth portion 73 of the worm 70 has a stopping portion 731, as shown in FIG. 5, and when the worm 70 is pulled upward excessively, the resilient locking spring 100 abuts against the support rack 60 to avoid a removal of the worm 70 from the support rack 60.

The strap roller 1 includes the flexible strap 2 fixed thereon to tie objects. When tying the objects, the manual crank 80 is rotated to expand the strap roller 1, and the movable segment 2b of the flexible strap 2 is inserted through the through groove 313 of the central shaft 30 to partially wind and press the movable segment 2b, then the worm 70 is vertically pulled outward to the disengagement position from the engagement position so as to disengage from the worm gear 40. Since the worm 70 does not engage with the worm gear 40, the user manually operates the rotation element 50 to drive the central shaft 30 to rotate (such as 1.5 circle in the clockwise direction) so that the flexible strap 2 winds the central shaft 30, thus tying the objects quickly. Thereafter, the worm 70 is vertically pushed downward to move back to the engagement position from the disengagement position, and the manual crank 80 is rotated for 5 to 6 circles to tighten the flexible strap 2, then the manual crank 80 is rotated and retracted in the locating trench 171, thus fixing the flexible strap 2.

Thereby, the strap roller 1 is rotated (such as 1.5 circles) easily and quickly by using the rotation element 50, and the manual crank 80 is rotated 5 to 6 circles to tie the objects easily and quickly.

When desiring to release the flexible strap 2, the manual crank 80 is rotated 5 to 6 circles in counterclockwise direction so that a tying tension of the flexible strap 2 reacts to the worm 70 via the worm gear 40, and the worm 70 is vertically pulled outward so as to disengage from the worm gear 40 and to move toward the disengagement position, then the central shaft 30 is rotated 1.5 circles reversely by using the rotation element 50, and the movable segment 2b of the flexible strap 2 is pulled outward or the movable segment 2b of the flexible strap 2 is pulled outward without rotating the rotation element 50, thus removing the movable segment 2b of the flexible strap 2 from the central shaft 30 quickly.

It is to be noted that when the worm 70 is pulled upward wrongly, the worm 70 moves from the engagement position to the disengagement position to cause an idle rotation, thus preventing damage the worm 70 or other components.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A strap roller comprising:
a frame including a first fence and a second fence connected with the first fence so as to define a receiving space, wherein the first fence has a first edge, and the second fence has a second edge;
a fixing post defined between the first fence and the second fence, and an end of the fixing post adjacent to the first edge being fixed with a coupling segment of a flexible strap;
a central shaft being rotatably connected between the first fence and the second fence of the frame and close to the second edge so that a movable segment of the flexible strap is inserted and winded;
a worm gear being fitted on an end of the central shaft and located outside the first fence;
a rotation element being fixed on the other end of the central shaft and located outside the second fence so as to be manually operated to quickly drive the central shaft to rotate;
a support rack being mounted on the frame and located outside the first fence, wherein the support rack includes a first coupling wall and a second coupling wall;
a worm including a first extension portion, a second extension portion, and a tooth portion between the first extension portion and the second extension portion, the first extension portion being fitted on the first coupling wall of the support rack; and the second extension portion being fitted on the second coupling wall of the support rack; the worm being limited to move between an engagement position and a disengagement position, wherein when the worm is limited at the engagement position, the tooth portion of the worm is engaged with the worm gear; and when the worm is limited at the disengagement position, the tooth portion of the worm is disengaged from the worm gear; wherein the first extension portion has a defining groove defined on an outer wall thereof;

a manual crank being connected on the first extension portion of the worm to drive the worm so that the worm actuates the worm gear and the central shaft to change a length and a tension of the flexible strap;

a cap being disposed on an outer wall of the first fence of the frame to cover the worm gear, the support rack, and the tooth portion of the worm; and a resilient locking spring being mounted on the cap so that when the worm is moved to the disengagement position, the resilient locking spring is limited in the defining groove of the worm.

2. The strap roller as claimed in claim 1, wherein the first fence has a first coupling orifice adjacent to the second edge, and the second fence has a second coupling orifice proximate to the second edge; the rotation element includes a case and a cavity formed inside the case, wherein the case has a cliff with respect to the second fence and two spaced orifices defined on the cliff; the worm gear includes two separated orifices; the support rack is engaged on the first fence of the frame and includes a positioning orifice; the central shaft includes a body with two half-moon pieces, wherein a respective one half-moon piece has a first segment and a second segment, and the first segment is inserted through the first coupling orifice of the first fence, the two separated orifices of the worm gear, and the positioning orifice of the support rack to engaged the first segment with a retainer so as to limit a removal of the support rack from the first fence; the second segment is inserted through the second coupling orifice of the second fence, the two spaced orifices of the rotation element to engage the second segment with another retainer so as to limit a removal of the rotation element from the second fence; a through groove is defined between the two half-moon pieces to receive the movable segment of the flexible strap.

3. The strap roller as claimed in claim 2, wherein the body has a wave-shaped spring fitted between the worm gear and the support rack.

4. The strap roller as claimed in claim 3, wherein the central shaft further includes two sheathes engaged with the first coupling orifice of the first fence and the second coupling orifice of the second fence to receive the body; each of at least one washer is defined between the two sheathes, the cliff of the rotation element, the wave-shaped spring, the worm gear, and the support rack; and one washer between the wave-shaped spring and the worm gear rotates with the worm gear.

5. The strap roller as claimed in claim 1, wherein the worm includes a base, a locking element, a receiving sleeve, and a screwing element; the base has a connector, a stem, and the tooth portion between the connector and the stem, and the connector is limited on a top of the second coupling wall of the support rack, wherein the stem has a head formed on a top thereof and having a rectangular cross section to engage with the manual crank, the locking element is columnar and is screwed with the connector of the base via the second coupling wall of the support rack and to form the second extension portion; the receiving sleeve is slidably fitted on the stem of the base to form the first extension portion and to expose the head outside, wherein the receiving sleeve further has a limiting trench; and the screwing element is screwed on the head of the stem to force the manual crank on the receiving sleeve.

6. The strap roller as claimed in claim 1, wherein the manual crank includes a first extension and a second extension rotatably connected with the first extension, a free segment of the first extension is located on the worm, and the second extension has a tubular grip rotatably connected on a free segment thereof and configured to be held by a user.

7. The strap roller as claimed in claim 6, wherein the frame further includes a stop sheet formed on the first fence thereof, and a locating trench is defined between the stop sheet and the outer wall of the first fence, such that after the second extension is rotated with respect to the first extension, the tubular grip is engaged in the locating trench.

8. The strap roller as claimed in claim 1, wherein the cap includes a notch with an opening facing the first fence of the frame, the resilient locking spring is formed in an Z shape and is fixed in the notch by being put from the opening, wherein the resilient locking spring has an arcuate retaining portion engaged in a limiting trench.

9. The strap roller as claimed in claim 8, wherein the cap includes a top fringe in which the notch is defined, and the top fringe has a passing orifice configured to receive the first extension portion of the worm, wherein the arcuate retaining portion of the resilient locking spring is received in the passing orifice.

* * * * *